(12) United States Patent
Offord

(10) Patent No.: US 9,242,665 B2
(45) Date of Patent: Jan. 26, 2016

(54) VEHICLE FRAME ASSEMBLY

(76) Inventor: David Leslie Offord, Maidenhead (GB)

(*) Notice: Subject to any disclaimer, the term of this patent is extended or adjusted under 35 U.S.C. 154(b) by 0 days.

(21) Appl. No.: 13/823,148

(22) PCT Filed: Sep. 13, 2011

(86) PCT No.: PCT/GB2011/051714
§ 371 (c)(1),
(2), (4) Date: Mar. 14, 2013

(87) PCT Pub. No.: WO2012/035333
PCT Pub. Date: Mar. 22, 2012

(65) Prior Publication Data
US 2013/0168947 A1   Jul. 4, 2013

(30) Foreign Application Priority Data

Sep. 15, 2010 (GB) .................................. 1015390.6

(51) Int. Cl.
*B62B 7/06* (2006.01)
*B62B 7/10* (2006.01)
*B62B 7/14* (2006.01)
*B62B 9/26* (2006.01)

(52) U.S. Cl.
CPC . *B62B 7/06* (2013.01); *B62B 7/105* (2013.01); *B62B 7/142* (2013.01); *B62B 9/26* (2013.01); *B62B 2203/04* (2013.01)

(58) Field of Classification Search
USPC ........................ 280/642–643, 647, 648, 650, 280/47.38–47.41, 657–658
See application file for complete search history.

(56) References Cited

U.S. PATENT DOCUMENTS

| 7,401,803 B1 * | 7/2008 | Lai | 280/647 |
| 2007/0069504 A1 * | 3/2007 | Lan | 280/642 |

FOREIGN PATENT DOCUMENTS

| EP | 1693277 A | 8/2006 |
| WO | 2007134185 A | 11/2007 |

* cited by examiner

*Primary Examiner* — J. Allen Shriver, II
*Assistant Examiner* — Erez Gurari
(74) *Attorney, Agent, or Firm* — The Weintraub Group, P.L.C.

(57) ABSTRACT

Apparatus comprising a vehicle frame assembly (4), first and second hinge devices (12) located on respective opposite sides of said frame assembly (4) and a child-carrying unit (26) mounted to the frame assembly (4), wherein the hinge devices (12) include first and second hinge parts (14 and 20), the first hinge part (14) having a child-carrying unit receptor device (28) for receiving respective first and second mounting devices of said child-carrying unit (26), wherein the receptor device (28) is resiliently rotatable relative to the first part (14).

7 Claims, 16 Drawing Sheets

VEHICLE FRAME ASSEMBLY

This invention relates to a vehicle frame assembly, and in particular to such an assembly to which a child-carrying unit is mountable.

According to a first aspect of the present invention, there is provided apparatus comprising a vehicle frame assembly, first and second hinge devices located on respective opposite sides of said frame assembly and a child-carrying unit mounted to the frame assembly, wherein the hinge devices include first and second hinge parts, the first hinge part having a child-carrying unit receptor device for receiving respective first and second mounting devices of said child-carrying unit, wherein the receptor device is resiliently rotatable relative to the first part.

According to a second aspect of the present invention, there is provided a method of folding a vehicle frame assembly comprising mounting a child-carrying unit to the frame assembly at a selected angular position with respect to the frame assembly, unlocking first and second hinge devices on respective opposite sides of said frame assembly, the hinge devices including first and second hinge parts, turning the first hinge part relative to the second hinge part about a hinge axis to bring about said folding, wherein said child carrying-unit is mounted to a resiliently rotatable receptor device of the first hinge part of respective hinge devices and, during said turning, said child-carrying unit and the receptor device are resiliently rotatable relative to the first hinge part such that the child-carrying unit maintains a position during said folding such that it will finally lie in a substantially horizontal plane in a fully folded condition.

Owing to these aspects, the vehicle frame assembly can be folded about the hinge devices whilst the child-carrying unit is mounted thereto and which remains, during the folding process, in a position which does not put in danger parts of the vehicle when folding takes place.

Furthermore, when the vehicle frame assembly is put into the erected state once again, the child-carrying unit advantageously returns to the same angular position as it was when the frame assembly was folded.

According to a third aspect of the present invention, there is provided a vehicle frame assembly comprising first and second hinge devices at respective opposite lateral sides of said frame assembly, an activating device for releasing the hinge devices, and a downwardly and rearwardly extending frame member including a foot-engaging region at a lower rearward region said frame assembly, whereby when said activating device is operated to release the hinge devices and pressure is applied to said foot-engaging region, said frame assembly folds in a substantially vertical plane.

According to a fourth aspect of the present invention, there is provided a method of folding a vehicle frame assembly comprising operating an activating device, thereby releasing first and second hinge devices located on respective opposite lateral sides of said frame assembly, applying pressure to a foot-engaging region of a downwardly and rearwardly extending frame member, whereupon said applying said frame assembly folds in a substantially vertical plane.

Owing to these aspects, the vehicle frame assembly can be folded by a user without the user having to significantly bend their back.

Preferably, the downwardly and rearwardly extending frame member extends from the region of the hinge devices.

According to a fifth aspect of the present invention, there is provided a child-carrying unit comprising a first surface profiled to support a child and a second surface disposed opposite to said first surface, wherein at one region, said second surface bulges away from said first surface forming an accessible compartment therebetween.

Owing to this aspect, a convenient compartment can be located in the child-carrying unit.

In order that the invention can be clearly and completely disclosed, reference will now be made, by way of example only, to the accompanying drawings, in which:—

Figure 3:
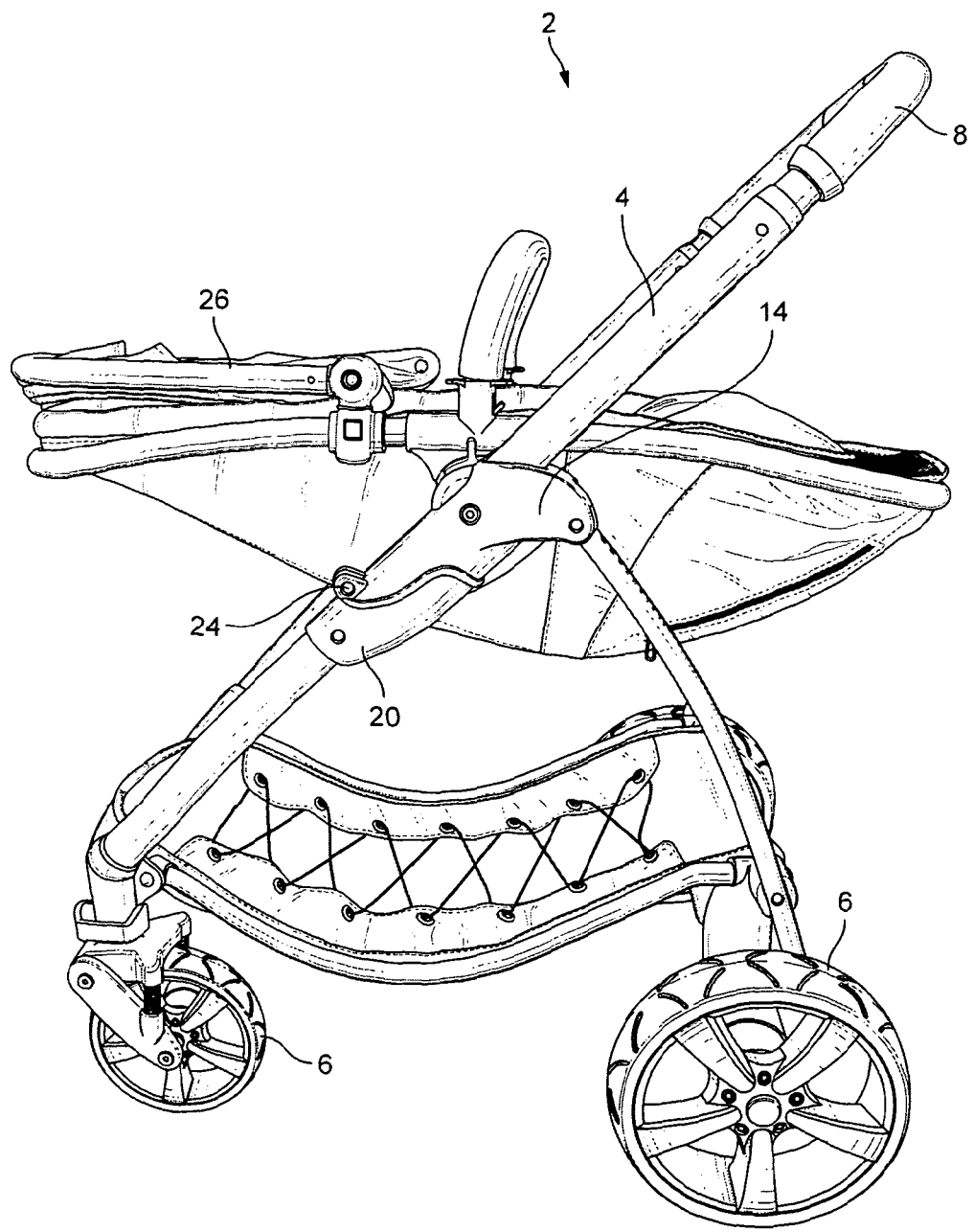
Figure 4:
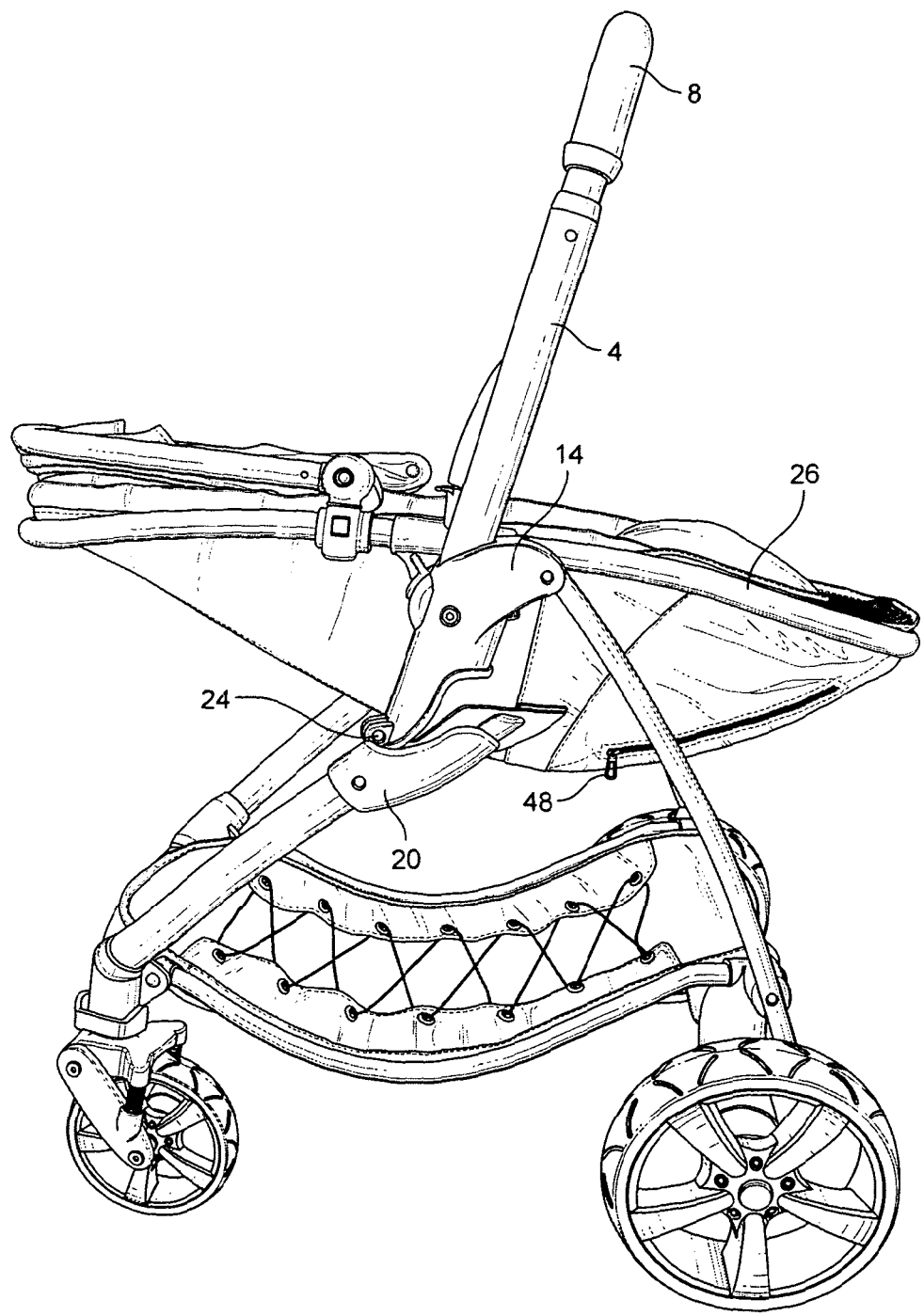
Figure 5:
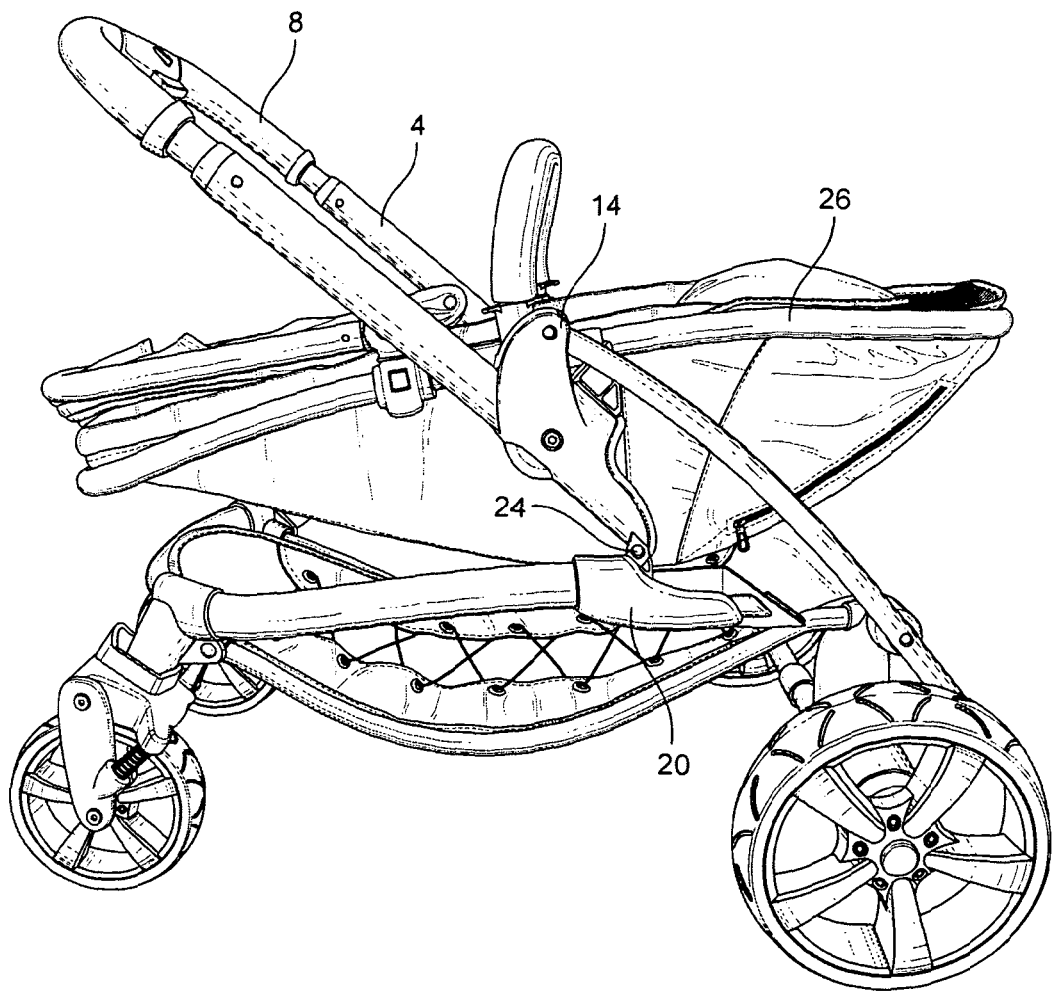
Figure 6:
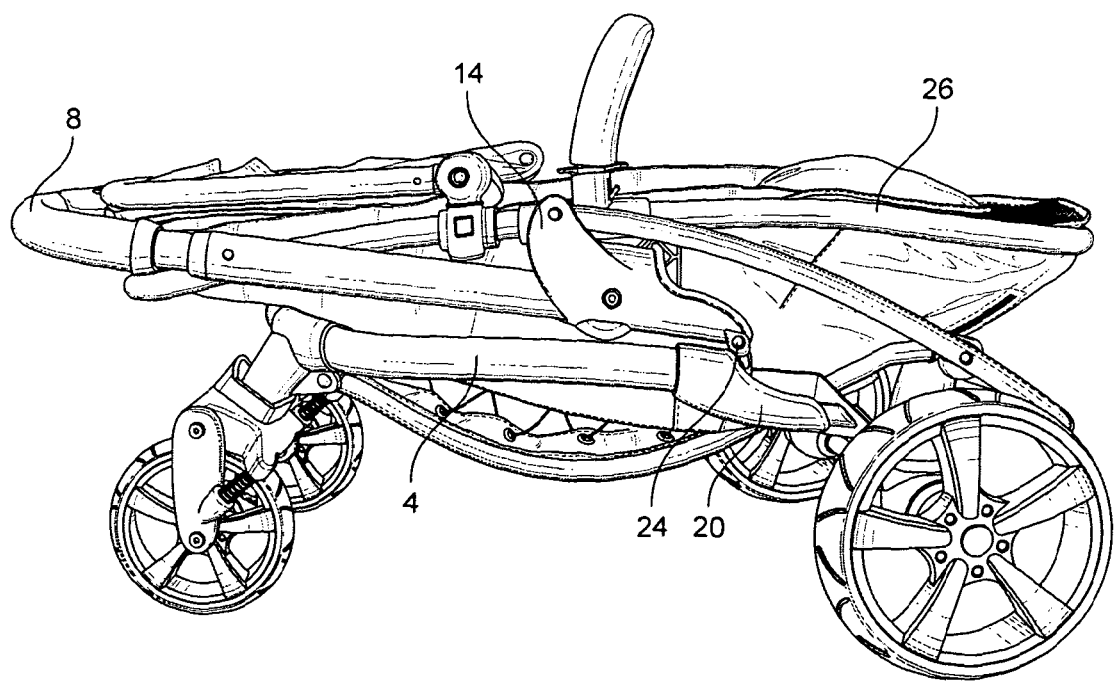
Figure 7:
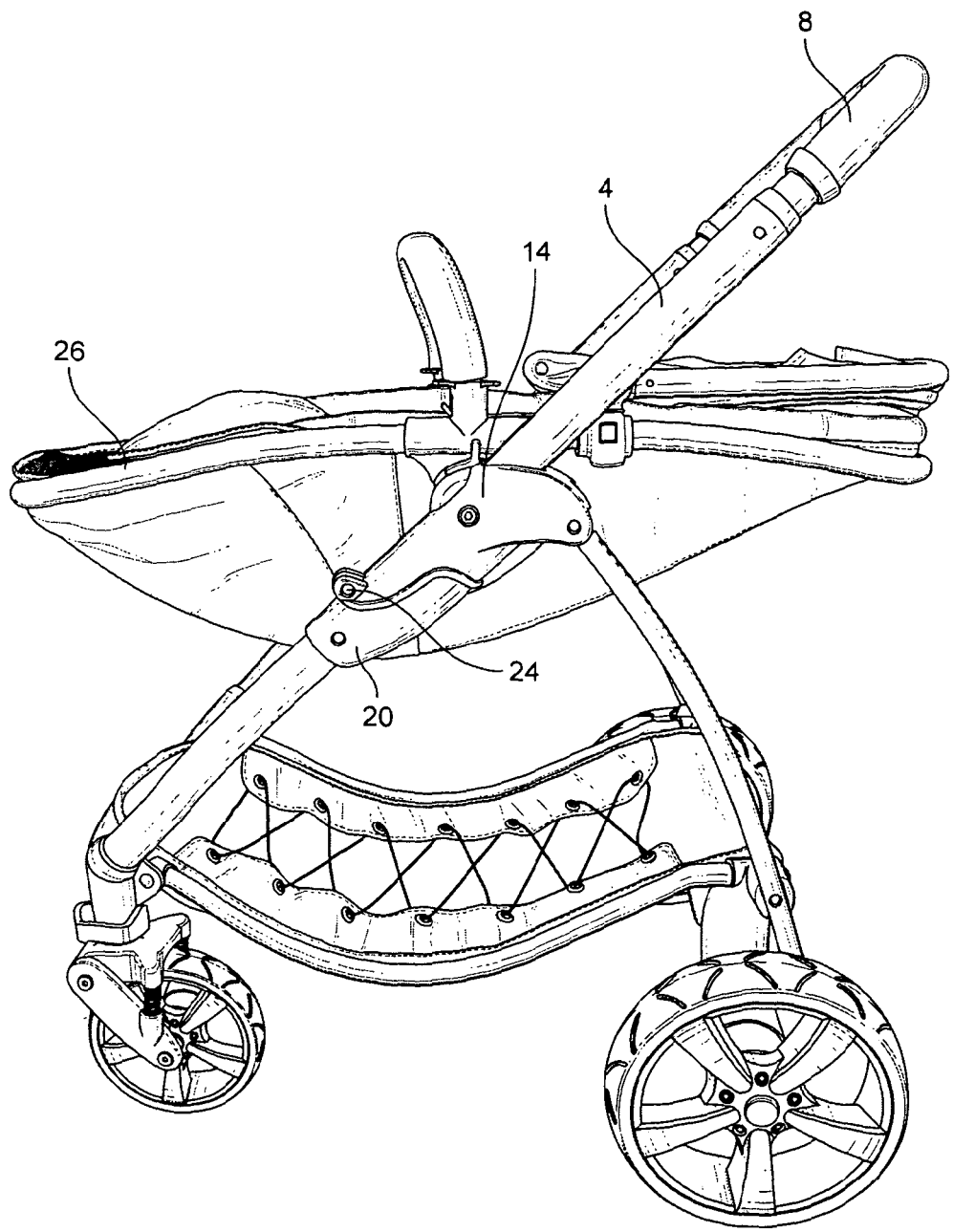
Figure 8:
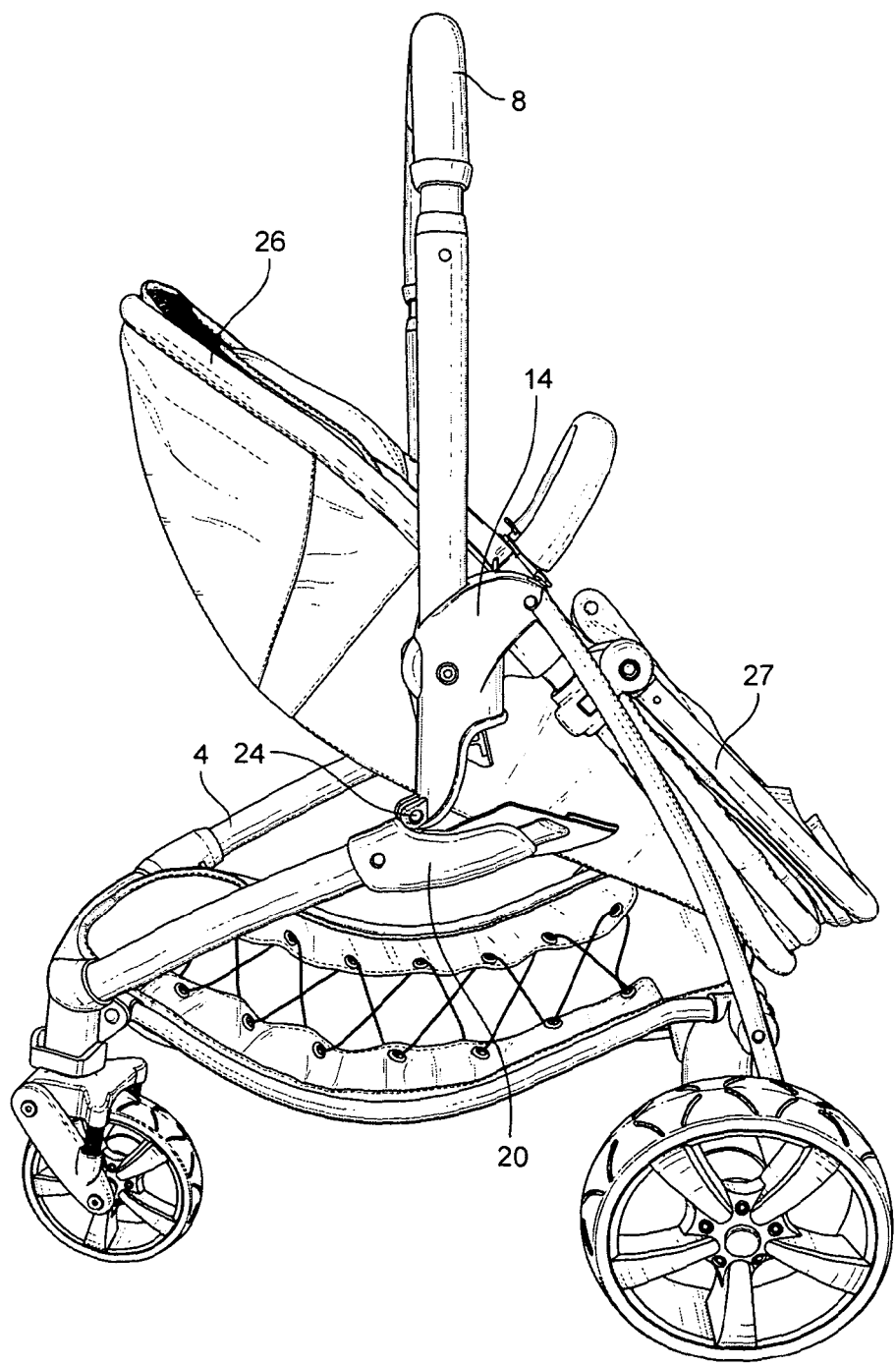
Figure 9:
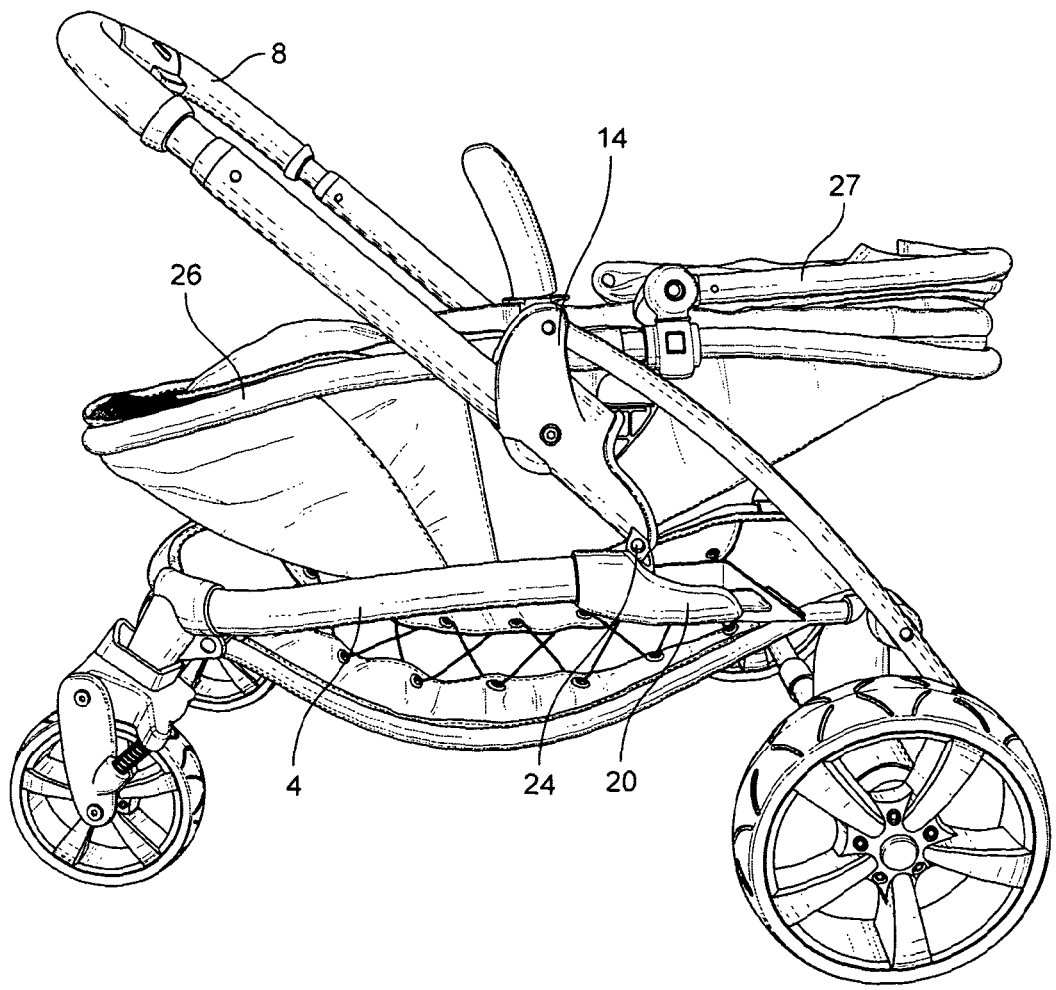
Figure 10:
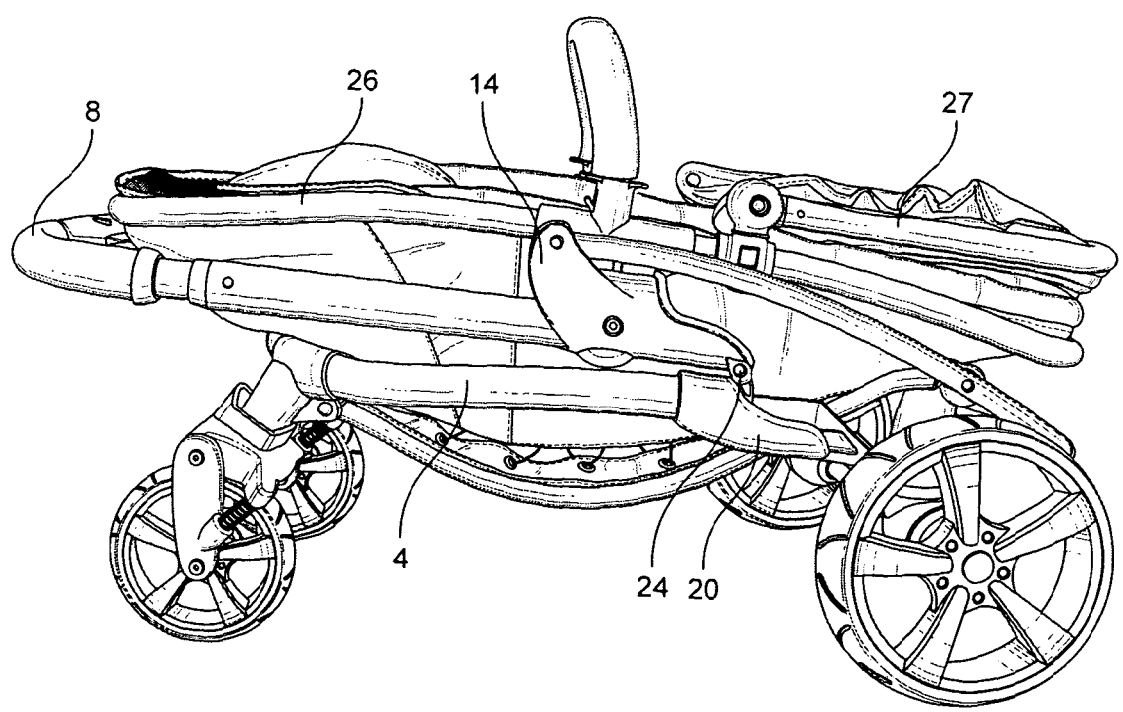
Figure 11:
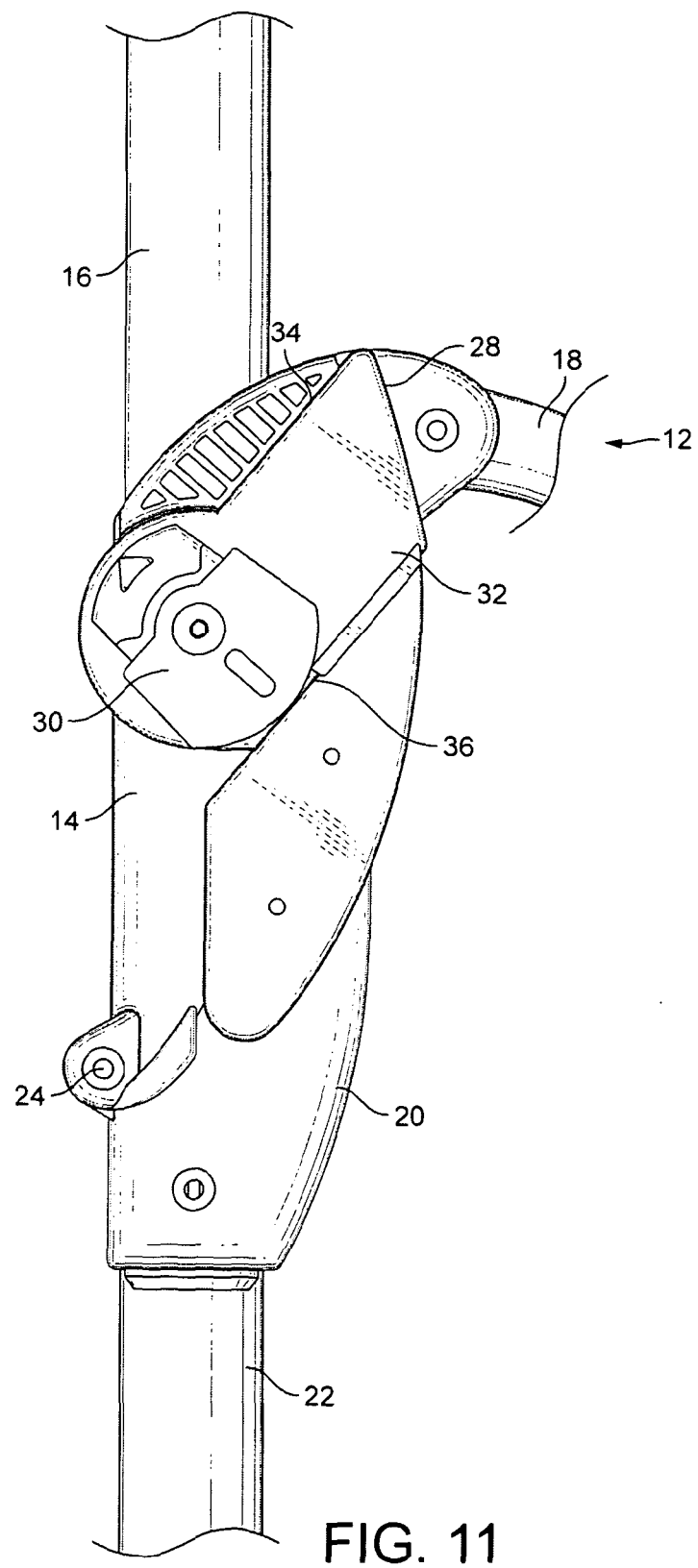
Figure 12:
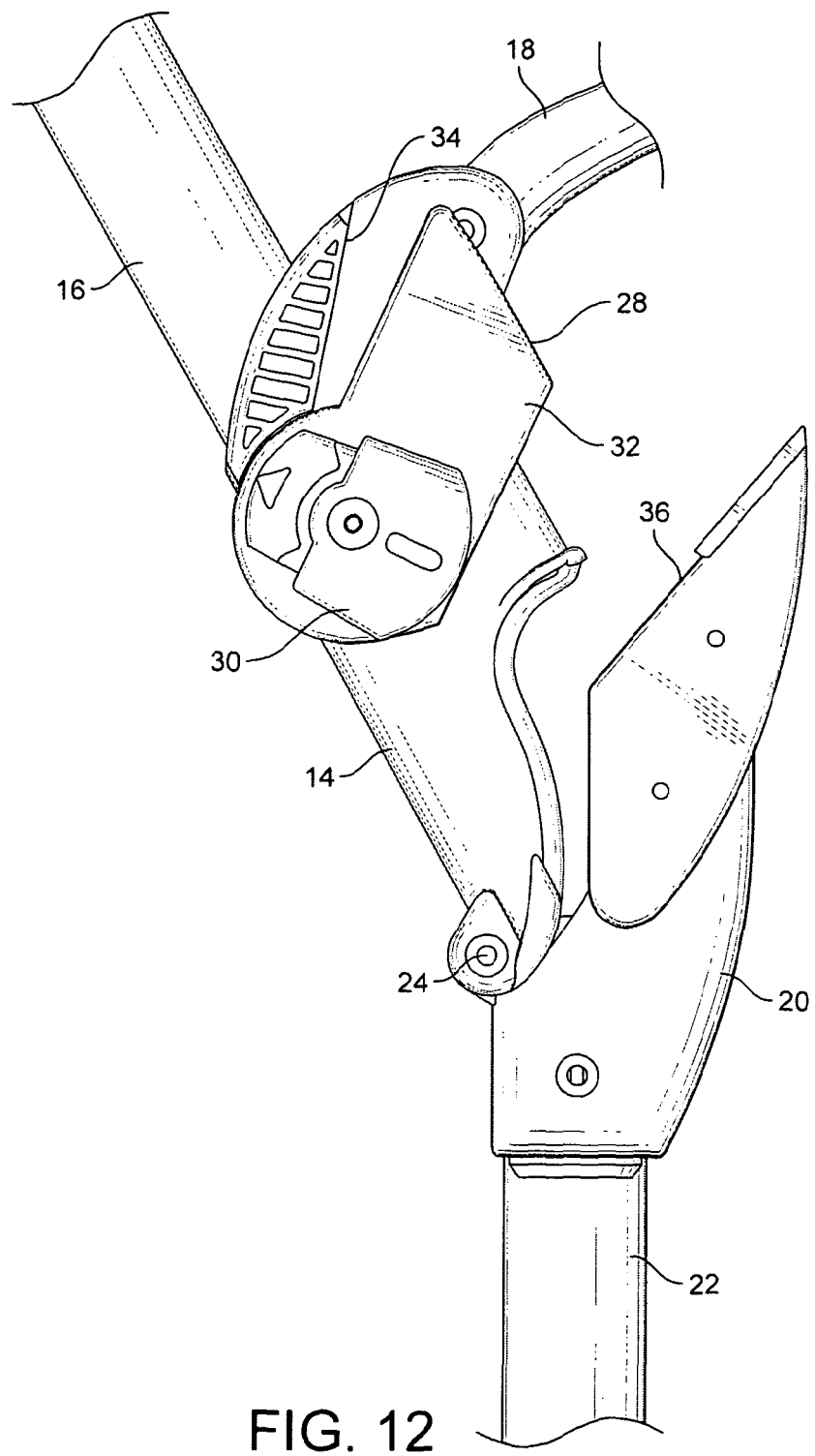
Figure 13:
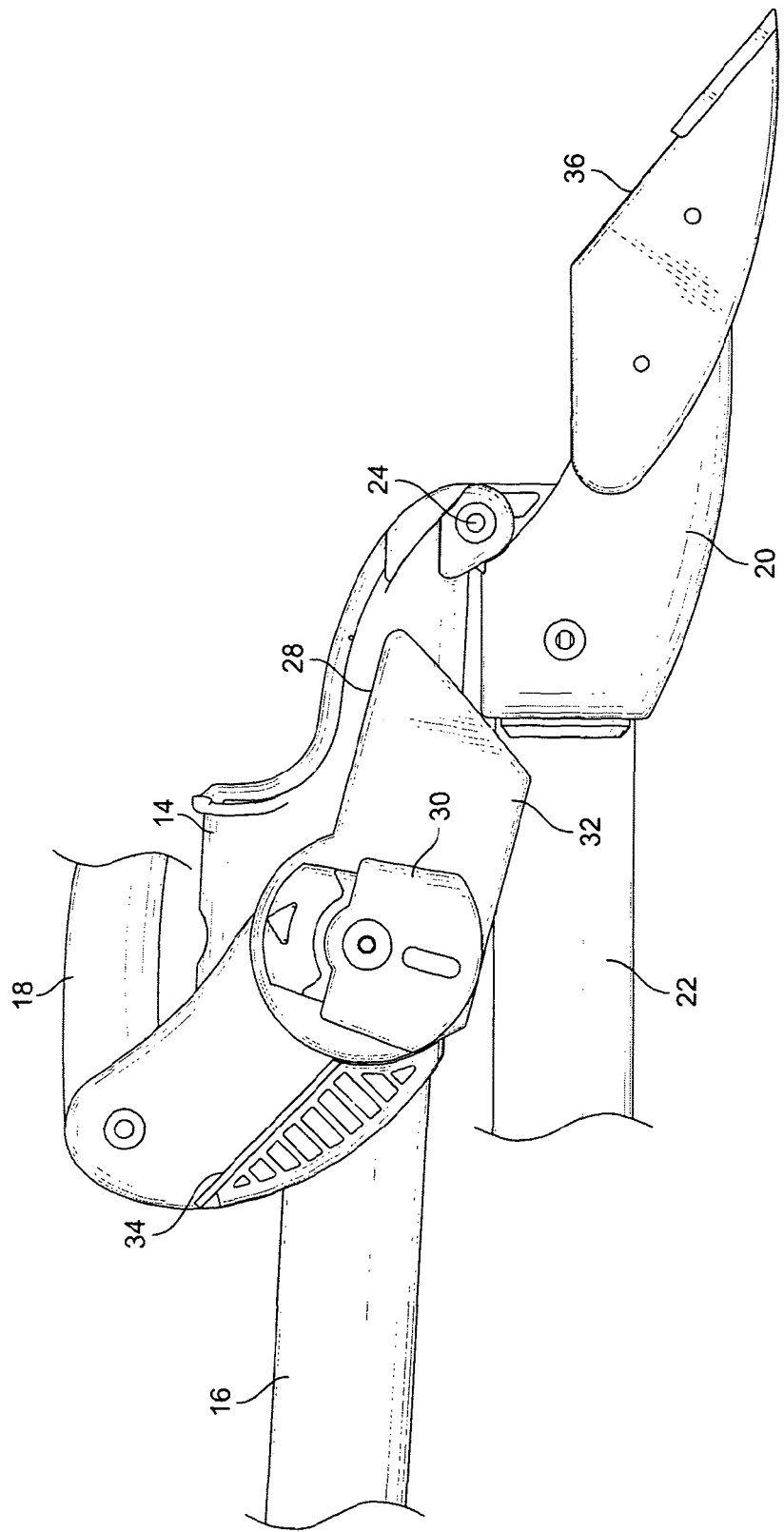
Figure 14:
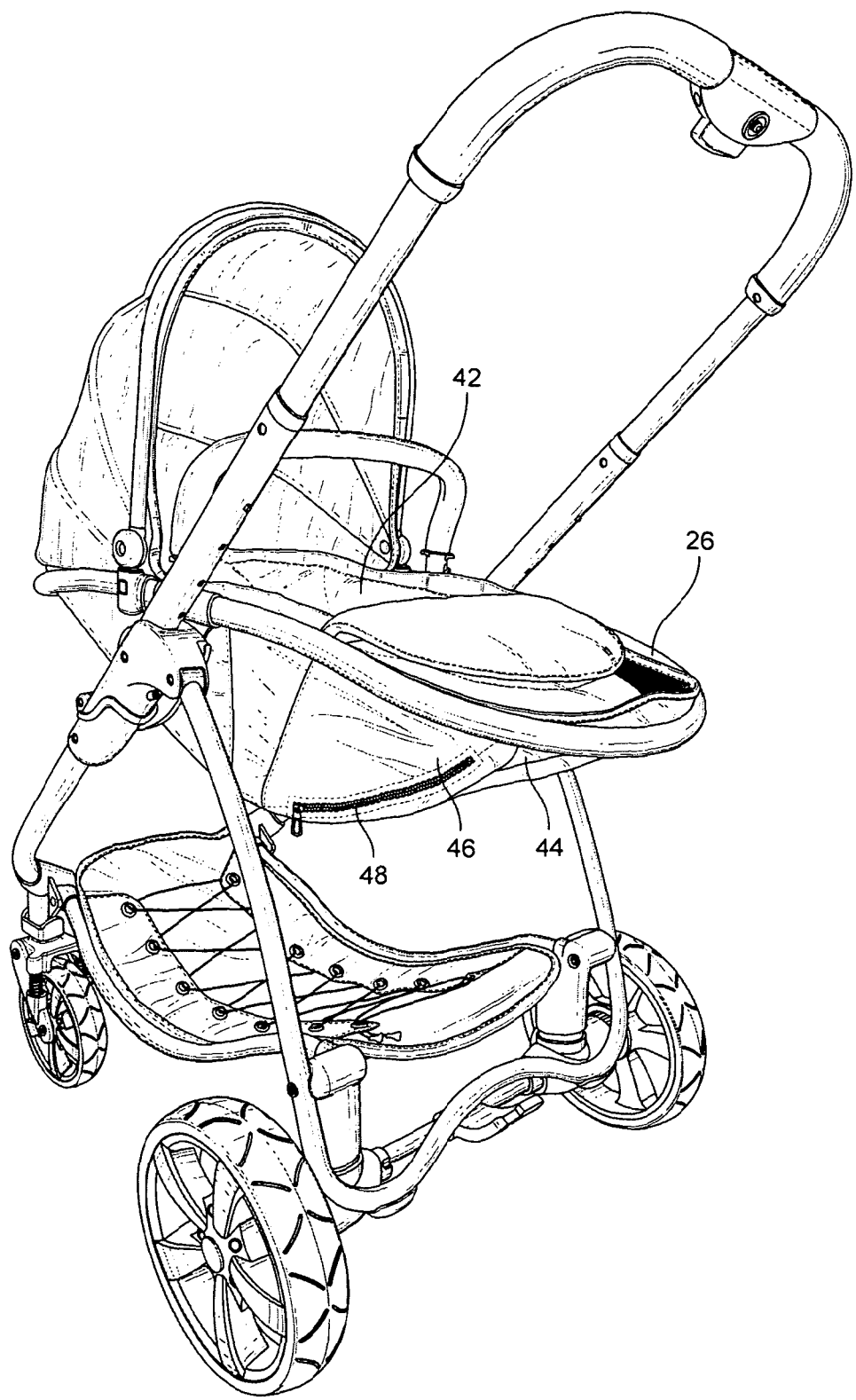
Figure 15:
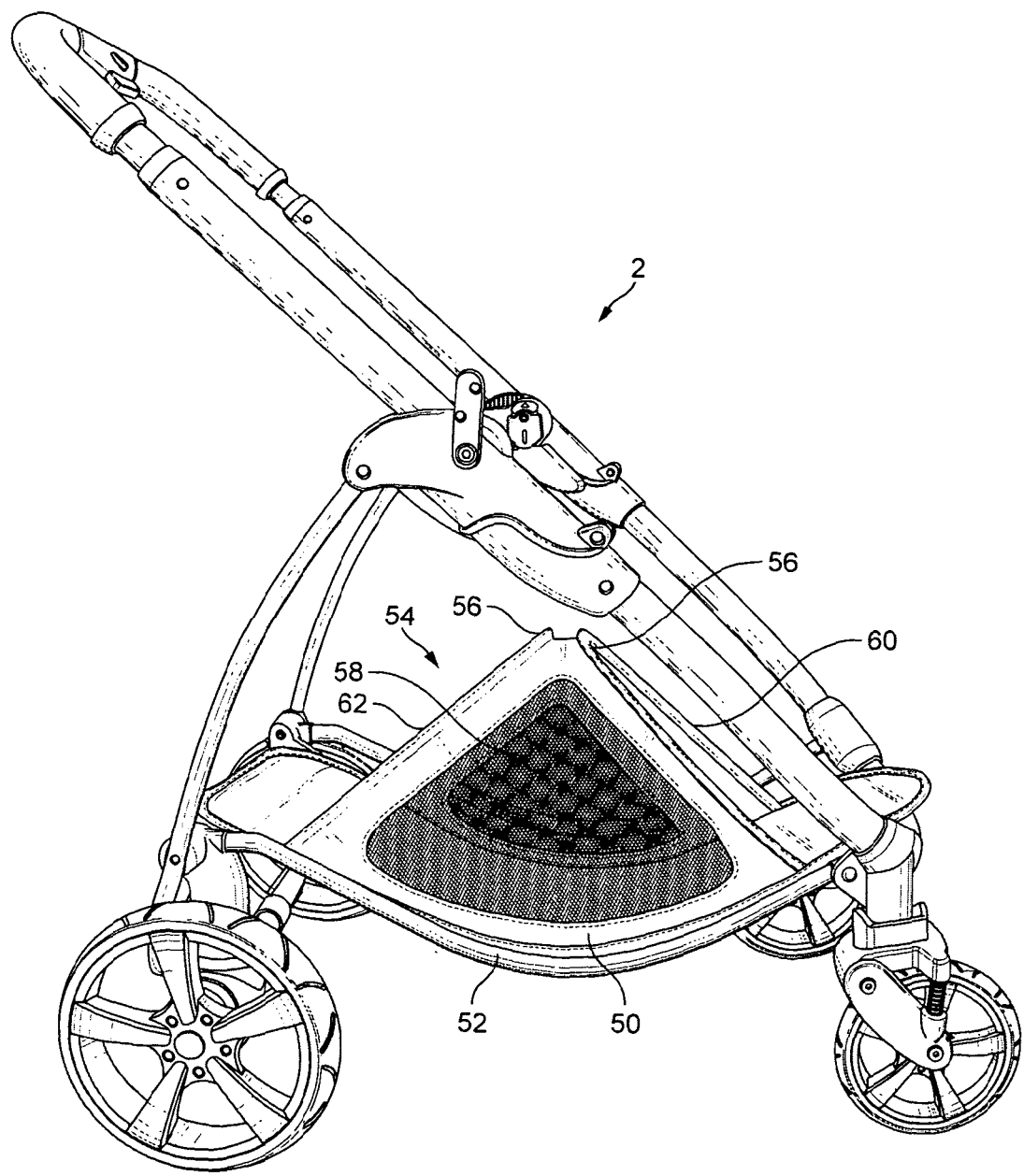
Figure 16:
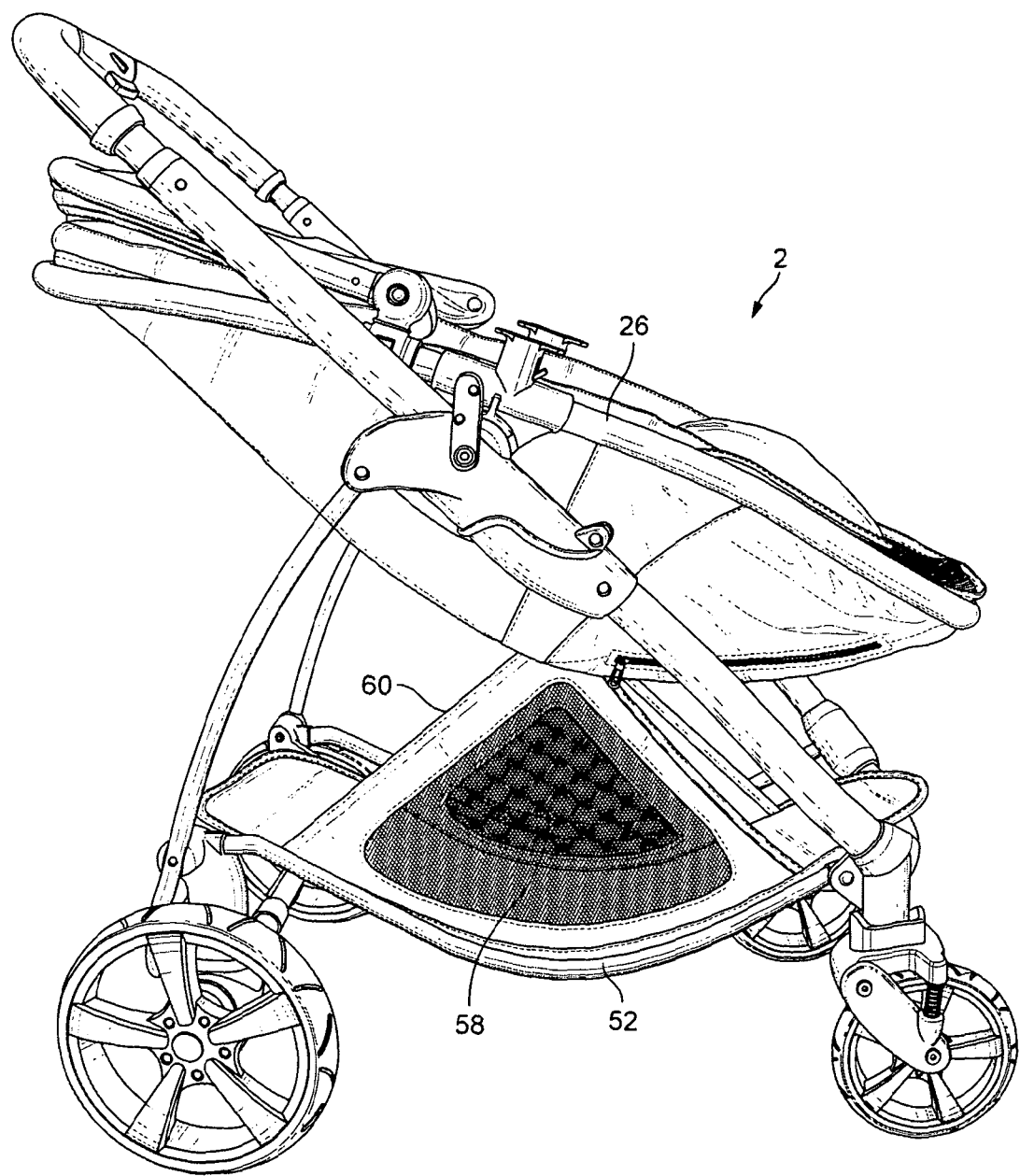

FIG. 3 is a side view of the frame assembly with a child seat mounted thereon in a rear-facing manner, FIG. 4 is a similar view to FIG. 3, but with the frame assembly partially folded, FIG. 5 is a view similar to FIG. 4, but with the frame assembly in more of a folded state, FIG. 6 shows a side view similar to FIGS. 3 to 5, but with the frame assembly in the fully folded condition, FIGS. 6 to 10 are views similar to those of FIGS. 3 to 6, but with the child seat mounted in a forward-facing manner, FIG. 11 is a side view of a hinge device of the frame assembly when the frame assembly is in the erected state, FIG. 12 shows a view similar to FIG. 11 but in a condition between the frame assembly being in the fully erected and the fully folded states, FIG. 13 shows a view similar to FIGS. 11 and 12 but with the frame assembly in the fully folded state, FIG. 14 is a perspective view of the frame assembly with a child-carrying unit mounted thereto, FIG. 15 is a perspective view of the frame assembly with a basket sub-frame, and FIG. 16 is a view similar to FIG. 15, but with a child-carrying unit mounted to the frame assembly.

For clarity purposes, FIGS. 11 to 13 do not show a child-carrying unit mounted thereto.

Figure 1:
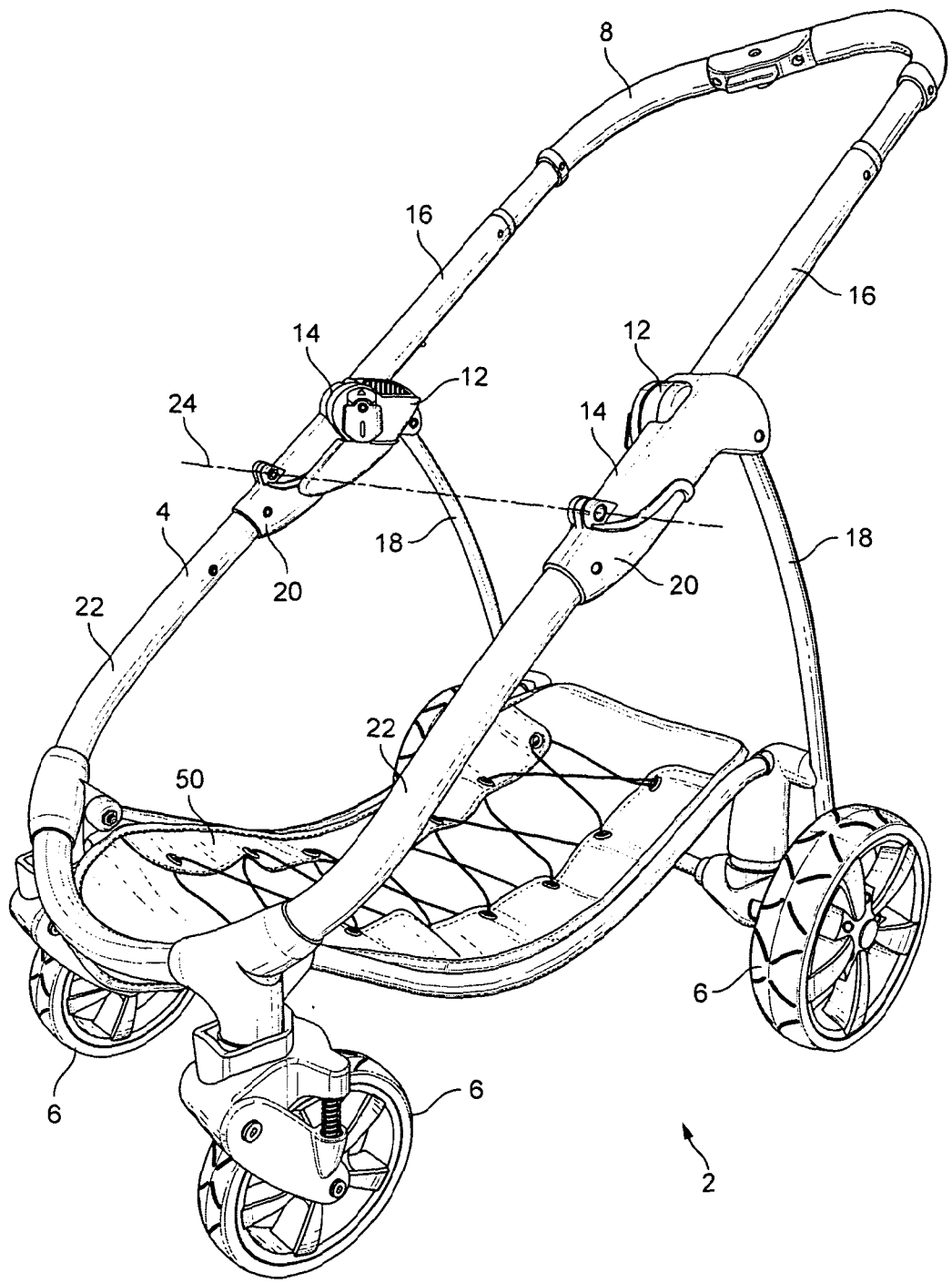
FIG. 1 shows a perspective view from the front of a vehicle frame assembly.

Referring to FIG. 1, a vehicle 2 for transporting children comprises a frame assembly 4, a plurality of ground-contacting wheels 6 attached to the frame assembly 4, and a handle 8 for grasping by the controller of the vehicle 2. The handle 8 is a substantially inverted U-shaped member telescopically connected to the frame assembly 4. A foot brake 10 is fitted to act upon the larger diameter rear wheels 6.

The frame assembly 4 further includes a pair of hinge devices 12, one on each of the respective opposite sides of the frame assembly 4. The hinge devices comprise a first hinge part 14 to which are connected the upwardly and rearwardly directed tubular struts 16 for accommodating the handle 8 and the downwardly and rearwardly directed tubular struts 18, and a second hinge part 20 to which is connected the downwardly and forwardly directed tubular struts 22 for the front wheels 6. A substantially horizontal hinge axis 24 is located between the first and second parts 14 and 20, about which the hinge devices 12 are turnable.

As shown in FIGS. 3 to 10, the vehicle 2 also includes a child-carrying unit in the form of a seat 26 releasably mounted to respective receptor devices 28 (see FIGS. 11 to 13) of the first parts 14 at a selectable angular position with respect to the frame assembly 4. The receptor devices include a first mounting surface 30 lying in a substantially vertical plane and an outwardly extending wall portion 32 also lying in that plane. The receptor devices 28 are resiliently rotatable, by way of a resilient device in the form of, for example, a coiled spring (mounted inside the housing of the receptor device 28), relative to the first parts 14, but are, in the erected state clamped between the first and second parts 14 and 20 where the wall portion 32 is sandwiched between, at the upper edge of the wall portion 32, an abutment surface 34 of the first piece 14 and, at the lower edge of the wall portion 32, an abutment surface 36 of the second part 20.

In this erected state, the hinge devices 12 are in a locked position by the position of a moveable slider pin inside the hinge devices 12 at the region of the receptor devices 28 which prevents the hinge parts being able to move relative to each other about the axis 24.

The seat 26 comprises first and second mounting devices each including a second mounting surface arranged to bear against the first mounting surface 30 and being rotatable relative thereto. Thus, in the locked and erected condition, the first and second mounting surfaces bear tightly against each other.

Once the handle 8 is pushed downwardly within the tubular struts 16, an actuating device causes the slider pin to move from the locked position to another position which allows the first part 14 to turn about the axis 24.

FIGS. 4 and 5, and 8 and 9 show, respectively, the frame assembly 4 in a progressively folded state with the seat 26 in the rear-facing and forward-facing configurations.

The activation of the unlocking of the hinge devices 12 the first part 14 together with the handle 8 is turnable about the axis 24 forwardly through a substantially vertical plane to convert the frame assembly 4 from an erected state to a fully folded state where the tubular struts 16 accommodating the handle 8 are arranged substantially parallelly to the tubular struts 22.

As the handle 8 moves forwardly in the folding procedure, the first parts 14 of the hinge devices 12 rotate about the axis 24 and, as a result, the receptor device 28, under tension from the coiled spring, rotates in an opposite direction to the turning about the axis 24. Thus, the seat 26 mounted to the receptor device 28 follows the rotation of the receptor device 28. In fact, the weight of the seat 26 adds to the rotation of the receptor device 28, but the resilience of the coiled spring prevents over-rotation of the seat 26.

Referring back to FIGS. 4 and 8, when the seat 26 is in the forward-facing configuration of FIG. 8, the extra weight of a seat hood 27 acts against the coiled spring and causes the seat 26 and receptor device 28 to rotate anticlockwise further than the situation where the seat 26 is in the rearward-facing configuration shown in FIG. 4. However, even in the situation in FIG. 8, the seat 26 does not rotate anticlockwise beyond the tubular struts 18 to assume a position where breaking of parts may occur upon forced folding.

FIGS. 11 to 13 show the hinge device 12 during the folding operation from the locked, erected condition in FIG. 11 where the wall portion 32 is sandwiched between the abutment surfaces 34 and 36 of the first and second parts 14 and 20 respectively. Upon release of the slider pin the abutment surface 34 of the first part 14 progressively parts from the upper edge of the wall portion 32 (as shown in FIG. 12) until upon full turning about the axis 24 to the fully folded condition, the hinge device is as appears in FIG. 13 with the upper edge of the wall portion 32 being at its maximum rotational distance from the abutment surface 34 of the first part 14 and in a position where the seat 26 will be substantially parallelly to the tubular struts 16, 18 and 22.

Referring back to FIGS. 3 to 6, the seat 26 remains in a position throughout folding so as to not assume a position where breaking of parts of the frame assembly 4 and seat 26 may occur if the vehicle 2 was forcibly folded in some way. Referring to FIGS. 7 to 10, although in FIG. 8, the seat 26 tilts anticlockwise momentarily as mentioned above, it returns to a substantially horizontal plane as the overall height of the vehicle 2 is reduced, as shown in FIGS. 9 and 10.

Figure 2:
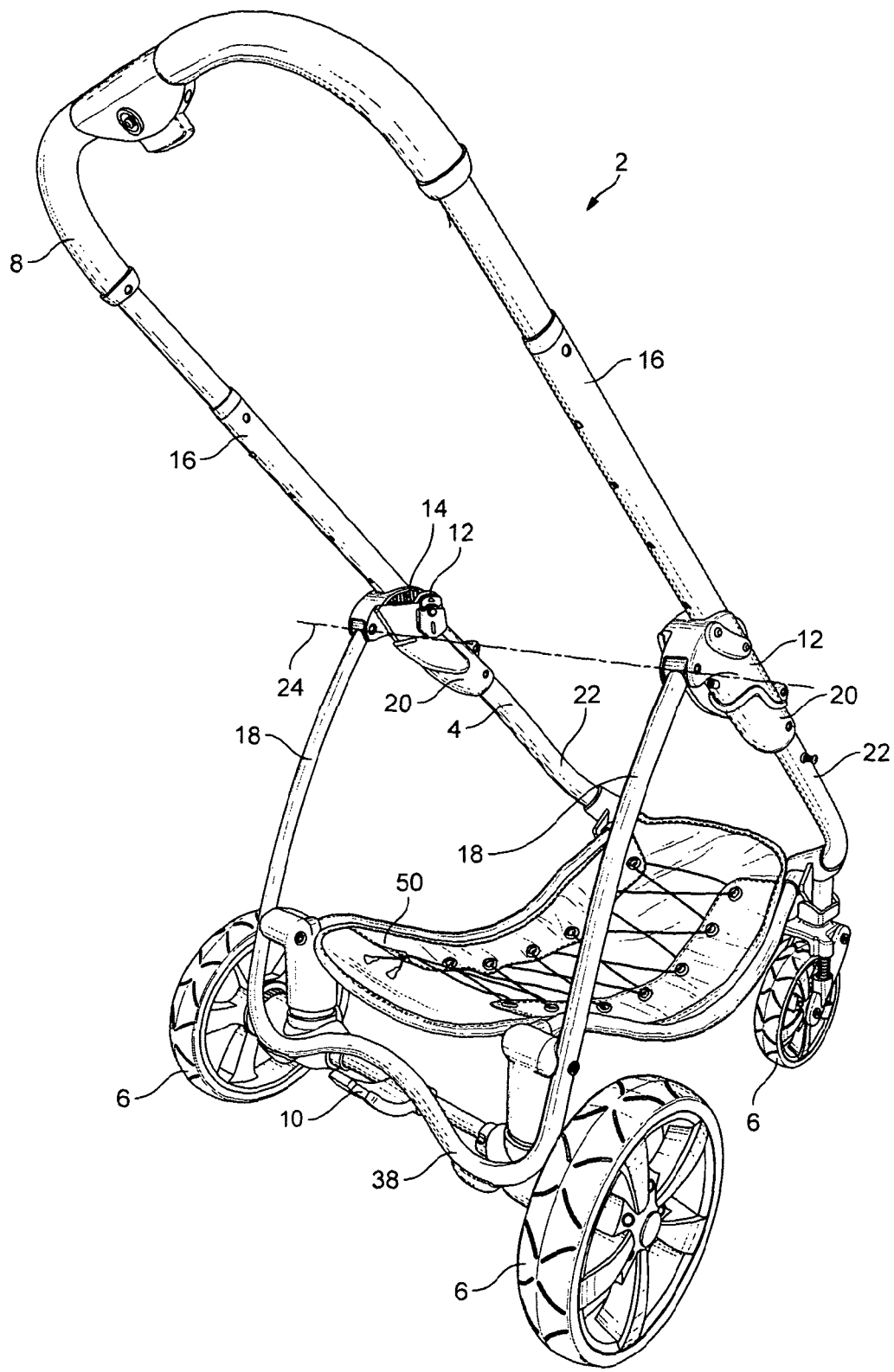
FIG. 2 shows a perspective view from behind of the frame assembly of FIG. 1.

Referring back to FIG. 2, the tubular struts 18 form part of a substantially W-shaped frame member, the lower part of which provides a foot-engaging region 38. The foot-engaging region 38 can be utilised in the folding operation whereby once the hinge devices 12 have been unlocked or released, if the controller of the vehicle presses, with a foot, on the foot-engaging region 38 so as to apply an inward force and the handle 8 is moved forwardly through the substantially vertical plane, the front wheels 6 lift off from the ground and the tubular struts 22 that lead towards the front wheels 6 and the tubular struts 16 that accommodate the handle 8 move closer together by way of turning about the axis 24. In this way, the vehicle can be folded to lie in a further substantially vertical plane substantially perpendicular to the substantially vertical plane through which the handle 8 is movable. Thus, if the controller suffers from back problems when bending of the spine is required, no such bending is necessary in the present case.

Once folded, a securing device (not shown), as is conventional, can be applied to keep the vehicle in the folded state.

When the frame assembly is subsequently erected from the fully folded condition, the receptor device again becomes sandwiched and clamped between the abutment surfaces 34 and 36 and in the locked state such that the seat 26 returns to its original angular position in relation to the frame assembly 4.

Referring to FIG. 14, the seat 26 comprises a profiled forward surface 42 on which a child is placed which is shaped to form a back rest portion, a seat portion and a leg rest portion. A back panel 44 of the seat 26, opposite the forward surface 42, bulges away from the forward surface 42, and the bulging reaches a maximum extent below the seat portion. Located in one side panel 46 of the seat 26 is a closable opening to a storage compartment between the surface 42 and the back panel 44. A zip fastener 48 is shown in FIGS. 4 and 15 to open and close the opening.

Referring now to FIGS. 15 and 16, the vehicle 2 further comprises a base wall 50 (also shown in FIGS. 1 and 2) bounded on respective opposite lateral edges by downwardly curved tubular frame members 52. A basket sub-frame 54 can be attached to the curved frame members 52 and which comprise at least one resilient sub-frame member. In the example shown, there are two inverted U-shaped resilient members 56, the free ends of which are connected to respective end zones of the curved frame members 52 and extend obliquely upwardly toward each other. A fabric cover 58 is applied to the resilient members 56 to form a basket 60 with an opening at the rearward end 62. The advantage of such a basket 60 is that it is collapsible, so that in the collapsed configuration the resilient members 56 lie in close proximity to the base wall 50 and, if the basket is needed, it can be transformed into an extended configuration in a pop-up manner, with the use of a single finger of the controller. In addition, the basket 60 can equally be collapsed in a pop-down manner by the controller pressing down on the resilient members 56. One advantage of the pop-up basket 60 is that if it is empty but the controller of the vehicle 2 forgets to collapse the basket 60 before folding, the back panel 44 of the seat 26 will collapse the basket when the vehicle 2 is folded.

The child-carrying unit may alternatively be a carry-cot.

The invention claimed is:

1. Apparatus comprising a vehicle frame assembly, first and second hinge devices located on respective opposite sides of said frame assembly and a child-carrying unit mounted to the frame assembly, wherein the hinge devices include first and second hinge parts, the first hinge part having a child-carrying unit receptor device for receiving respective first and second mounting devices of said child-carrying unit, wherein the receptor device is resiliently rotatable relative to the first part and comprises means for biasing the mounting devices toward each other.

2. Apparatus according to claim 1, wherein the respective receptor devices include a first mounting surface and an outwardly extending wall portion.

3. Apparatus according to claim 1, and further comprising a resilient device whereby the respective receptor devices are resiliently rotatable.

4. Apparatus according to claim 3, wherein said resilient device is a coiled spring mounted inside a housing of the respective receptor devices.

5. Apparatus according to claim 2, wherein, when said vehicle frame assembly is in an erected condition, the respective receptor devices are clamped between the first and second parts and the wall portion is sandwiched between, at an upper edge of the wall portion, an abutment surface of the first part and, at the lower edge of the wall portion, an abutment surface of the second part.

6. Apparatus according to claim 5, wherein, in the erected state, the hinge devices are locked in position by a moveable slider pin at the region of the respective receptor devices.

7. Apparatus according to claim 1, wherein said child-carrying unit comprises a first surface profiled to support a child and a second surface disposed opposite to said first surface, wherein at one region, said second surface bulges away from said first surface forming an accessible compartment therebetween.

\* \* \* \* \*